(No Model.)
R. M. GARDINER.
HAY AND GRAIN UNLOADER.
No. 318,558. Patented May 26, 1885.
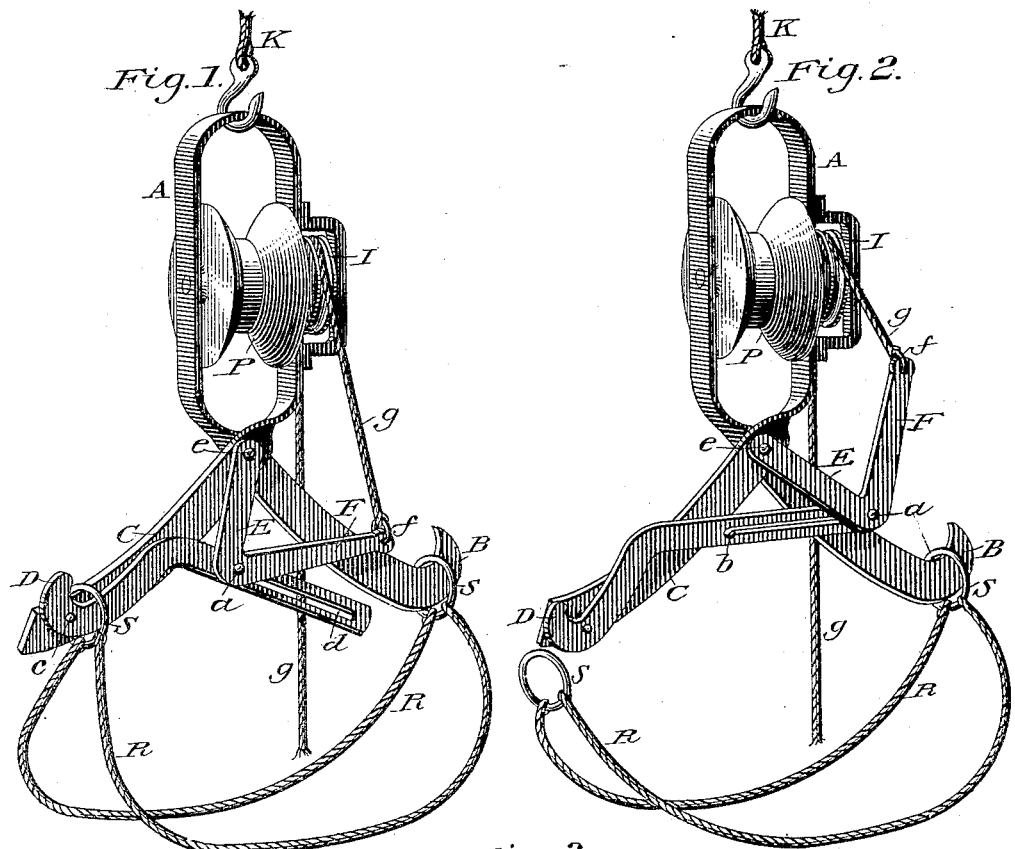
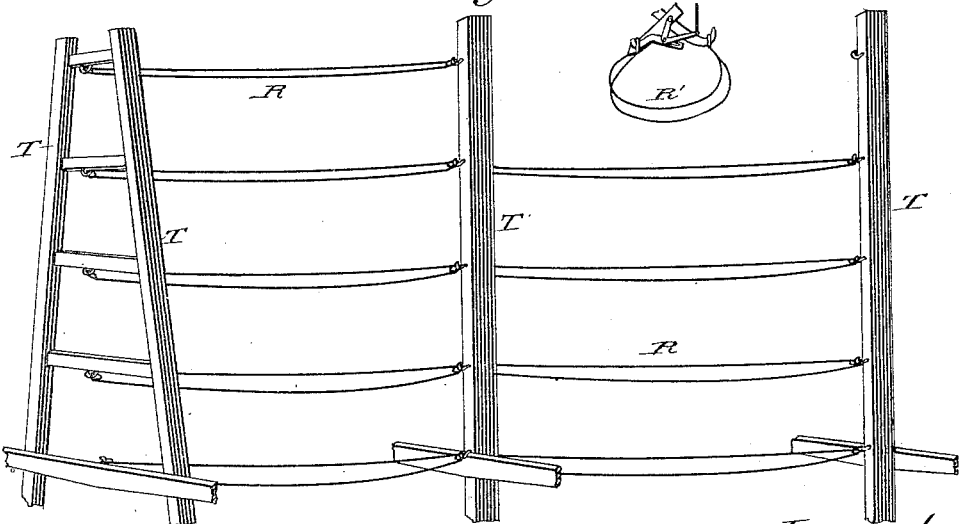
Witnesses:
Lucas Flattery
L. C. Christy
Inventor:
Robert M. Gardiner
per H. B. Swartz
Atty.

UNITED STATES PATENT OFFICE.

ROBERT M. GARDINER, OF FREDERICKSBURG, OHIO.

HAY AND GRAIN UNLOADER.

SPECIFICATION forming part of Letters Patent No. 318,558, dated May 26, 1885.

Application filed April 18, 1885. (No model.)

*To all whom it may concern:*

Be it known that I, ROBERT M. GARDINER, a citizen of the United States, residing at Fredericksburg, in the county of Wayne and State of Ohio, have invented a new and useful Hay and Grain Unloader, of which the following is a specification.

My invention relates to hay and grain unloaders wherein are employed a series of slings placed at intervals under the hay or grain while loading. Its object is to provide an improved tackle for elevating the slings and discharging the same at any desired point, and which will admit of the use of shorter slings than heretofore used for like purpose. I accomplish this object by the devices illustrated in the accompanying drawings, in which—

Figure 1 is a view of my improved sling unloader, showing both ends of the sling secured upon the tackle. Fig. 2 is a sectional view of the same, showing one end of the sling disengaged from the tackle. Fig. 3 is a view of my method of arranging the several slings in the load upon an ordinary hay-rack, so as to provide for short slings.

Referring to the drawings, A is the frame of my improved sling-tackle, which may be elevated either by a single rope, K, or by a double rope (using the pulley P) in any of the usual methods of elevating unloaders. The lower end of the tackle has opposite outwardly-curved arms B C. The arm B is provided with a stationary hook to engage one end loop $s$ of the unloading-sling R. The arm C is provided with a detaching-hook, D, which is pivoted at $c$, and terminates at the end opposite the hook with the slotted lever $d$. The inner end of this slot may be slightly notched, as shown at $b$. At $e$, the intersection of the arms B C, is hung a swinging trip-lever, E, which connects and coacts with the slot $d$ by the sliding pivot $a$, at which point the trip-lever bends outwardly in an arm, F, which connects at its outer end, $f$, with a trip-rope, $g$, passing over a trip-pulley, I. The slings R are successively spread across the load at proper intervals while loading, and in such use are preferably suspended upon upright hay-ladders T, as shown, Fig. 3. A central post, T', will be of advantage in long racks. In unloading, the opposite end loops $s$ of each sling are successively drawn over the hooks B D, as shown, (R', Fig. 3.) The trip-lever E F is drawn toward the hook D until the sliding pivot $a$ rests in the notch $b$, and then the sling, and with it a section of the load, is elevated in the usual way.

To discharge the sling, the operator draws upon the trip-rope $g$, thus elevating the trip-lever arm F to F'. By this movement the hook D is depressed to D' behind the arm C, which disengages the end loop, $s'$, from the tackle and discharges the load. The tackle A is then drawn down again upon the load to engage another sling in a similar manner, and thus the operation is repeated until all the slings (and with them the entire load) have been unloaded.

I am aware that the use of slings for like purposes is not new, and I do not therefore claim such, broadly; but,

Having thus fully described my invention, what I claim as new, and desire to secure by Letters Patent, is—

In a hay and grain unloader, the combination, with the unloading-sling R, provided with terminal loops $s$, of the elevating-tackle A, having opposite hooked arms B C, the arm C, provided with the detaching-lever hook D, having slot $d$, the trip-lever E F, coacting therewith by the sliding pivot $a$, trip-rope $g$, and trip-pulley I, substantially as set forth, and for the purpose specified.

In testimony whereof I hereunto set my hand in presence of two witnesses.

ROBERT M. GARDINER.

Witnesses:
 LUCAS FLATTERY,
 HIRAM B. SWARTZ.